(12) United States Patent
Suzuki et al.

(10) Patent No.: US 6,876,631 B2
(45) Date of Patent: Apr. 5, 2005

(54) METHOD AND APPARATUS FOR FRAME TRANSMISSION

(75) Inventors: Takashi Suzuki, Yokosuka (JP); Toshiro Kawahara, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 743 days.

(21) Appl. No.: 09/755,448

(22) Filed: Jan. 5, 2001

(65) Prior Publication Data

US 2001/0019558 A1 Sep. 6, 2001

(30) Foreign Application Priority Data

Jan. 25, 2000 (JP) ........................................ 2000-015991

(51) Int. Cl.$^7$ ................................................ H04J 1/16
(52) U.S. Cl. .................... 370/252; 370/474; 370/510; 709/228
(58) Field of Search ................................ 370/252, 337, 370/394, 320, 474, 510, 389, 465, 466, 400, 401; 704/500, 229; 709/228, 227; 345/544

(56) References Cited

U.S. PATENT DOCUMENTS

| 6,058,118 A | 5/2000 | Rault et al. |
| 6,061,356 A * | 5/2000 | Terry .......................... 370/401 |
| 6,088,342 A * | 7/2000 | Cheng et al. ............... 370/320 |
| 6,169,821 B1 * | 1/2001 | Fukunaga et al. .......... 382/239 |
| 6,335,933 B1 * | 1/2002 | Mallory ...................... 370/394 |

FOREIGN PATENT DOCUMENTS

| JP | 178406 | 6/1998 |
| WO | WO 96/21293 | 7/1996 |

OTHER PUBLICATIONS

ITU–T Recommendation H.226, "Channel aggregation protocol for multilink operation on circuit–switched networks", I.363 (Sep., 1998).

* cited by examiner

*Primary Examiner*—John Pezzlo
(74) *Attorney, Agent, or Firm*—Brinks Hofer Gilson & Lione

(57) ABSTRACT

A terminal transmits via a control channel to another terminal a command demanding header configuration modification. Then the former terminal continues to receive frames with configuration before the modification and at the same time waits for frames with configuration after the modification.

13 Claims, 8 Drawing Sheets

METHOD AND APPARATUS FOR FRAME TRANSMISSION

FIELD OF THE INVENTION

The present invention relates to a method and apparatus for frame transmission having a capability of frame configuration modification.

PRIOR ART

As a method to realize a high speed data communications and multimedia communications, a multilink operation which aggregates physical channels into one channel has been known. A method for the multilink operation is stipulated in the ITU-T Recommendation H.226. Stipulated, in the H.226, is an all-purpose flexible multilink protocol which has a capability of aggregating physical channels which have various kind of characteristic and various transmission speed.

FIG. 5 shows a data stream input to the multilink from higher layer and a frame format for transmitting the data stream according to the H.226. The data stream is divided into data sets having appropriate length (for example data sets 1 and 2 in FIG. 5), and is distributed onto the physical channels (Channels 0 to M-1). The smallest unit of data which is always kept contiguous when distributing data among multiple channels is called as Sample. In the H.226, the size of the Sample is 8 bits. In order for each data set segment to be recognizable by the receiving end, header sets (for example, header sets 1 and 2) which indicate the heads of the data sets are put in. The header sets have headers and information. The headers are to be transmitted onto each channel. The information is for reconstructing data set at the receiving end.

FIG. 6 shows the header configuration according to the H.226. The header can broadly divided into two kinds of field, a mandatory field and an optional field. The mandatory field comprises a FLAG, a Control Field, and a Header CRC. The FLAG is for establishing a frame synchronization. The Control Field is for showing whether or not each optional field exists. The optional field comprises a Sequence Number, a Channel TAG, a Channel Proportion, and a Data CRC. By using the control field, it is possible to decide whether or not to use each of these constituent parts of the optional header for each frame.

FIG. 7 shows the procedure of frame configuration modification by using the Control field according to the H.226. The Control field comprises Flags showing the field length and whether or not each optional field exists. In FIG. 7, for explanatory purpose, the Sequence number is abbreviated as SN, the Channel TAG CT, the Channel Proportion CP, and the Data CRC D. For example, when the SN equals "01", the CT equals "01", the CP equals "00", and the D equals "00", the optional field has a 1-byte Sequence Number field and a 1-byte Channel TAG field, and does not have the Channel Proportion field and the Data CRC.

As described above, by configuring the header configuration as the occasion requires during the transmission, a flexible and efficient transmission is made possible.

The main target of the H.226 is a cable communications. A proposal of a mobile multilink protocol is made as an extension of the H.226 targeting a mobile communications. It is for wireless communications with more bit error rate than cable communications.

In the mobile multilink protocol, in order to enhance error tolerance, by extending a synchronization flag and introducing a frame length information, the frame synchronization is reinforced. At the beginning of the communications, the synchronization flag is extracted from the received bit stream. The synchronization flag is followed by a frame length information. By using the frame length information, the frame synchronization is established. Here, length of each frame is changeable, but in order to prevent losing the synchronization in a case when a bit error occurs in the frame header, the mobile multilink protocol recommends a fixed length frame. When fixed length frame is used in the mobile multilink communications, the frame length information is necessary only at the beginning of the communications, hence becomes unnecessary after the frame synchronization is established and communications condition becomes stable. Continuing to transmit this kind of information which becomes unnecessary during the communications is not desirable from the viewpoint of transmission efficiency.

As for the H.226, when the header configuration modification method by the H.226 is used, because the transmitting side is able to freely modify the header configuration, a flexible and efficient transmission is possible. However, the method of the H.226 has its weakness towards bit errors. FIGS. 8A and 8B explain the problem of this method under the presence of bit errors.

In FIG. 8A, in order to establish a frame synchronization at the beginning of communications, the transmitting side transmits frames with frame length information (length information in FIG. 8A) prescribed times and then frames without frame length information on the assumption that the frame synchronization is established. However, if there happens a burst bit error in the transmission and hence headers with frame length information transmitted at the beginning of transmission are not received correctly, it would be extremely difficult to establish a frame synchronization under a presence of bit error by using subsequent headers which do not have frame length information.

In FIG. 8B, an explanation is made for a case when frame length is changed during communications. During the communications, the transmitting side transmits frames with frame length information prescribed times and then frames without frame length information. However, if there happens a burst bit error in the transmission, and hence headers with frame length information after the modification are not received correctly, the receiving side cannot know the modification of frame length and tries to continue to hold the frame synchronization by using the frame length before the modification. Hence the loss of synchronization will happen. And reestablishing the synchronization is very difficult under the presence of bit error by using headers without frame length information.

Therefore, an idea would come up that the transmitting side transmit a header configuration modification request message, and when the receiving side receives the message, the receiving side transmits a request response message when the modification is possible, and transmits none or a request denial message when the modification is not possible. The transmitting side can modify the header configuration only when it receives the request response message.

In this method, it is possible to prevent a failure of receiving the frame length information at the receiving side, and a reliable header configuration modification is also possible. However, this method requires longer time to modify the header configuration. Especially, as in a satellite communications and mobile communications which have long transmission delay time due to the round trip, it can be possible that the header configuration modification requires more than one second. During that time, the frame transmission with low efficiency has to be used.

SUMMARY OF THE INVENTION

Accordingly, the object of the present invention is to provide a frame transmission method and apparatus which can modify frame configuration quickly and certainly.

According to an aspect of the present invention, there is provided a frame transmission method comprising a step of transmitting a request command for frame configuration modification and a step of, after transmitting the command, continuing to receive frames with configuration before the modification and at the same time waiting for frame with configuration after the modification.

According to another aspect of the present invention, there is provided a frame transmission apparatus comprising a frame transmitting means for transmitting to an apparatus of a communications partner frames and a request command for frame configuration modification, and a frame receiving means for receiving frames from the apparatus of the communications partner, the frame receiving means being for, when the request command for frame configuration modification is transmitted to the apparatus of the communications partner, continuing to receive frames with configuration before the modification and at the same time waiting for frame with configuration after the modification.

According to the present invention, when there is a request for frame configuration modification, quick modification of the configuration is possible without replying the request. Further, it is possible to avoid transmission errors before and after the frame configuration modification.

DESCRIPTION OF THE PREFERRED EMBODIMENT

Below, a preferred embodiment of the present invention will be explained for more complete understanding of the present invention. This embodiment is for an explanatory purpose, does not limit the present invention, and can be modified within the scope of the present invention.

Structure of an Embodiment

Figure 1:
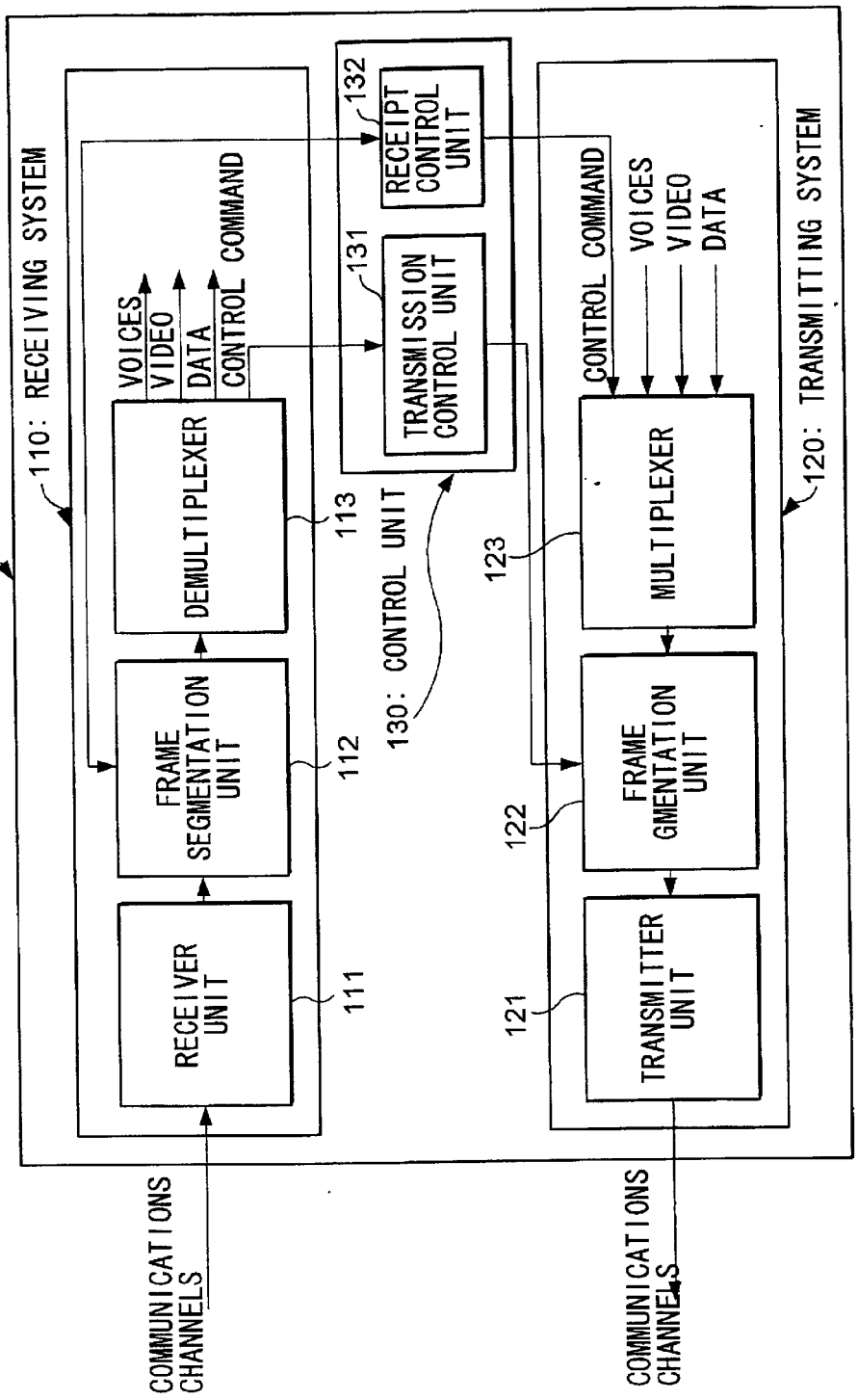
FIG. 1 is a block diagram showing the configuration of the frame transmission apparatus 100 according to the present invention.

FIG. 1 is a block diagram showing the structure of the frame transmission apparatus according to the present invention. The frame transmission apparatus 100 is able to transmit and receive frames via a network, and comprises a receiving system 110, a transmitting system 120, and a control unit 130 as shown in FIG. 1.

The receiving system 110 comprises a receiver unit 111, a frame segmentation unit 112, and a demultiplexer 113. The receiver unit 111 receives frames from an apparatus of a communications partner through a communications channel. The frame segmentation unit 112 establishes a frame synchronization by using the synchronization flag and the frame length information, and segments the frame into header and payload. The payload is input to the demultiplexer 113, then segmented into control command and user data such as voices, video and data. The frame transmission apparatus 100 transmits and receives the control command (for example, frame configuration modification request) through a (in-band) control channel multiplexed in the communications channel. The control command output from the demultiplexer 113 is input to a transmission control unit 131, and then used to control frame header configuration at the transmitting side.

The transmitting system 120 comprises a transmitter unit 121, a frame generation unit 122, and a multiplexer 123. The transmitter unit 121 transmits frames through communications channels. The frame generation unit 122 generates frames by adding headers to data input from the multiplexer 123. The headers added here are generated based on control messages from the transmission control unit 131. The multiplexer 123 multiplexes control command and user data such as voices, video, and data into one bit stream. Here, the control command input to the multiplexer 123 is generated at a receipt control unit 132 based on communications condition such as frame synchronization. The transmission control unit 131 analyzes the control command received through the control channel, and based on the result of the analysis, controls header generation at the frame generation unit 122. The receipt control unit 132 monitors frame receiving conditions at the frame segmentation unit 112, and when detects an establishment of the frame synchronization, transmits a request command for frame configuration modification including the current frame length information to the multiplexer 123 and notifies the frame segmentation unit 112 of the transmission of the command.

Operation of the Embodiment

Figure 2:
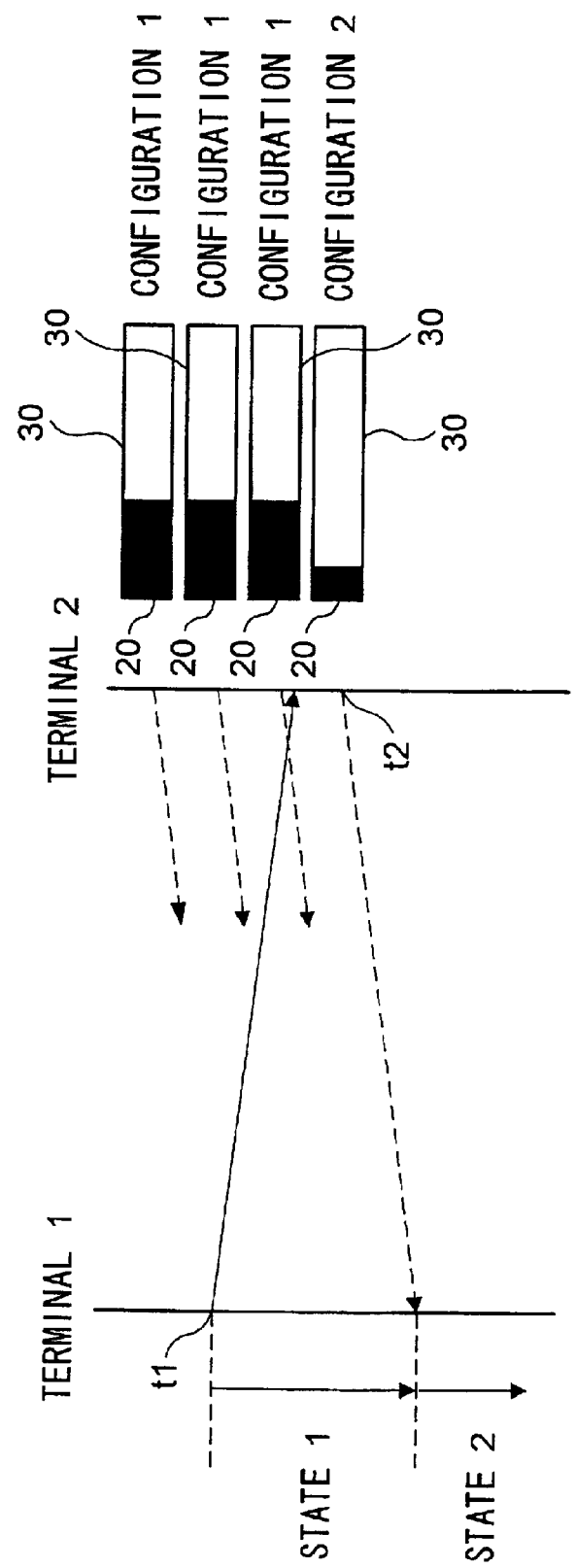
FIG. 2 is a sequence diagram showing the control procedure for the header configuration modification according to the present invention.

FIG. 2 is a sequence diagram during the header configuration modification by using the frame transmission apparatus 100 according to the present invention. In this sequence, an assumption is that there is a synchronization between a terminal 1 and a terminal 2 and frame transmission of configuration 1 is being conducted.

When the frame synchronization is established at the terminal 1, the receipt control unit 132 of the terminal 1 outputs commands (hereinafter, referred to simply as a "command") to the multiplexer 123. The multiplexer 123 multiplexes the command and user data such as commands, video, voices, and data. Then the multiplexer 123 outputs the multiplexed data to the transmitter unit 121 via the frame generation unit 122. In FIG. 2, the multiplexed data including the command is transmitted from the terminal 1 at the time t1.

The receipt control unit 132 of the terminal 1 which generated the commands makes an order to the frame segmentation unit 112 which carries out frame segmentation to continue to segment frames of configuration 1 and to wait for frames of configuration 2 (STATE 1 in FIG. 2).

Figure 3:
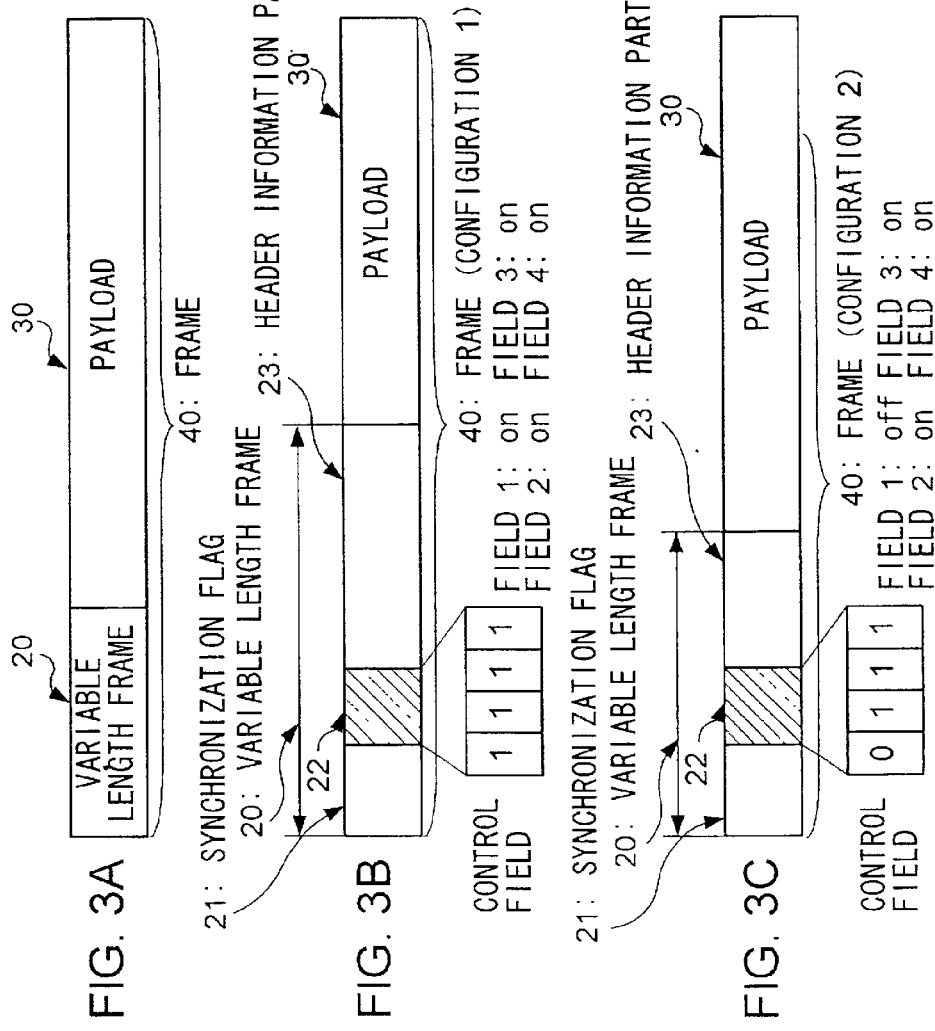
FIGS. 3A to 3D show the frame configuration according to the present invention.

When the frame segmentation unit 112 which got the order receives frame, the unit 112 sees a control field 22 (see FIG. 3) of the header of the received frame and makes a judgment of frame configuration.

Figure 4:
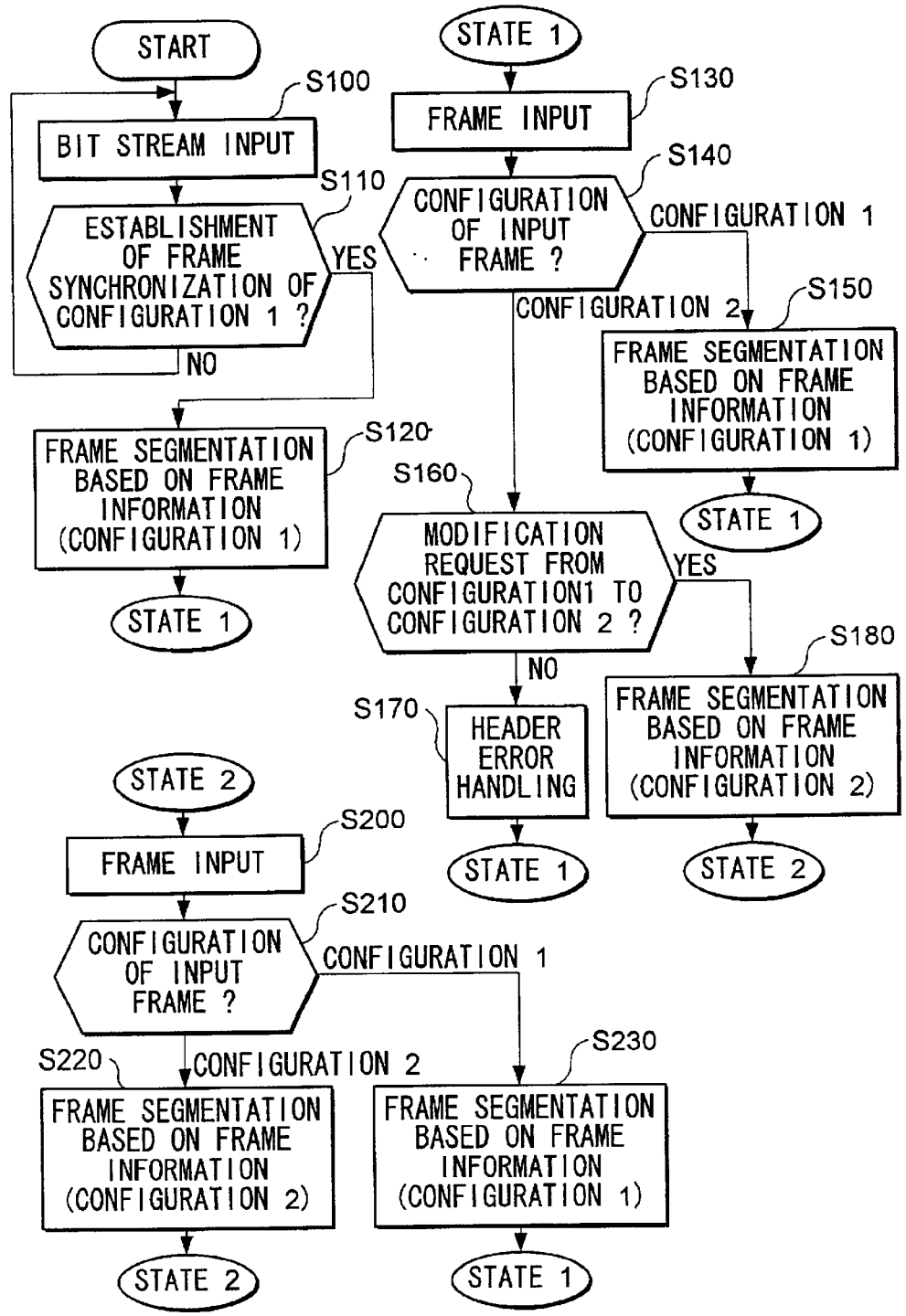
FIG. 4 is a flowchart showing the control procedure for the header configuration modification according to the present invention.
Figure 5:
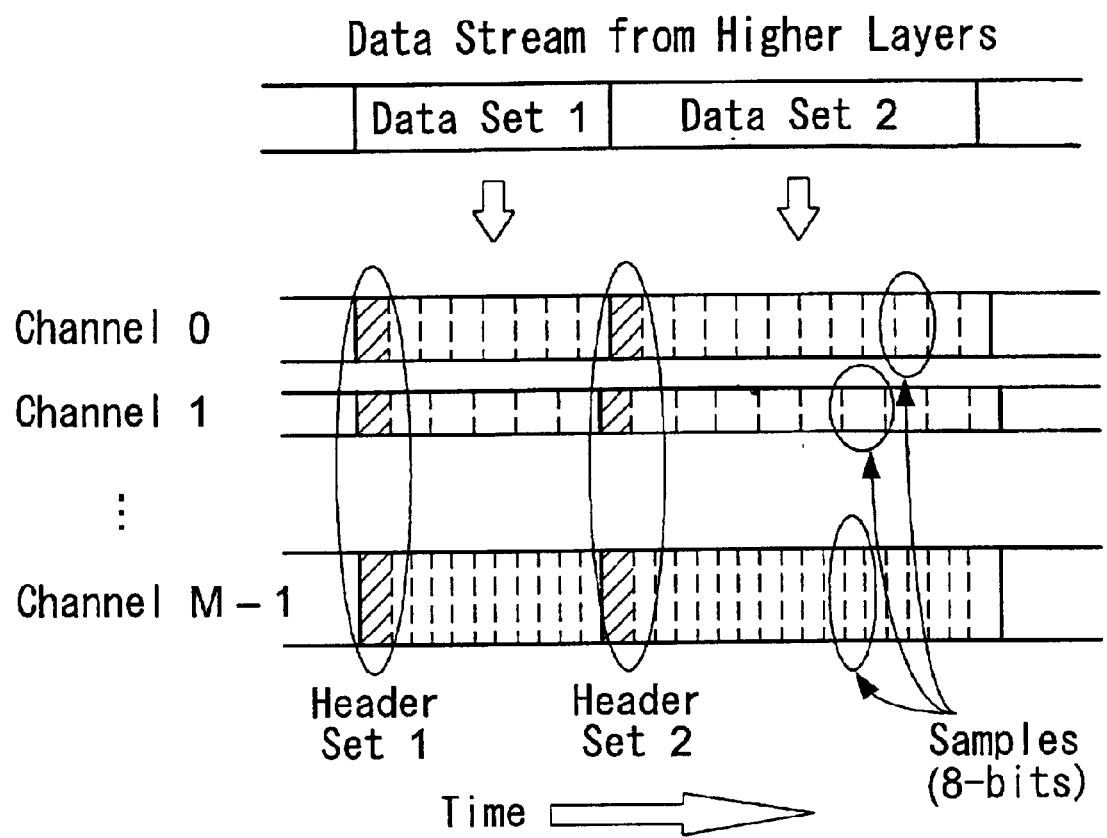
FIG. 5 shows the frame configuration according to the ITU-T Recommendation H.226.
Figure 6:
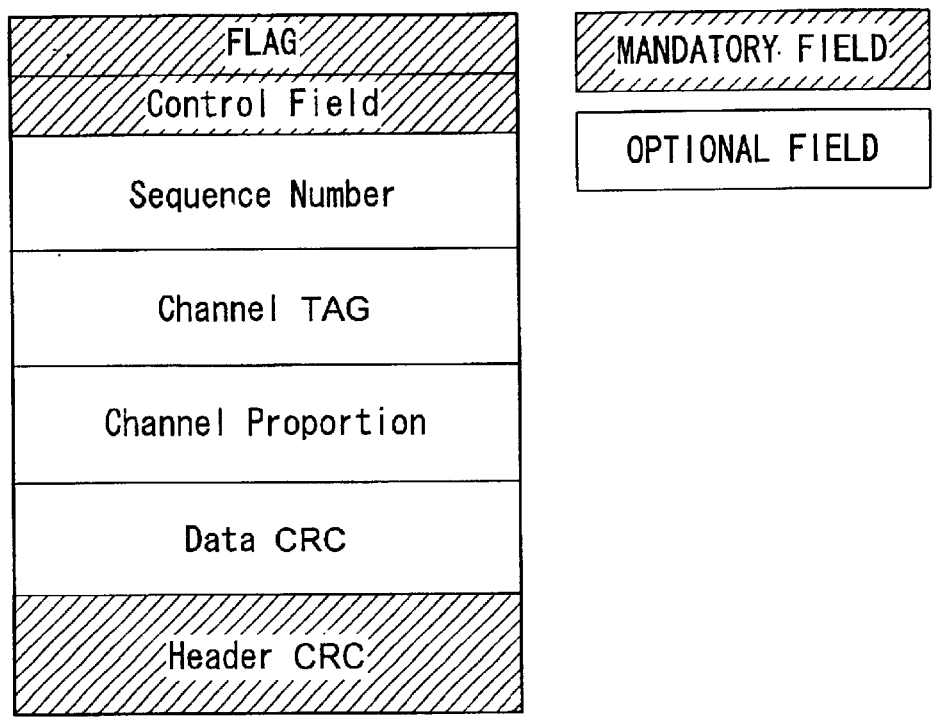
FIG. 6 shows the frame header configuration according to the H.226.
Figure 7:
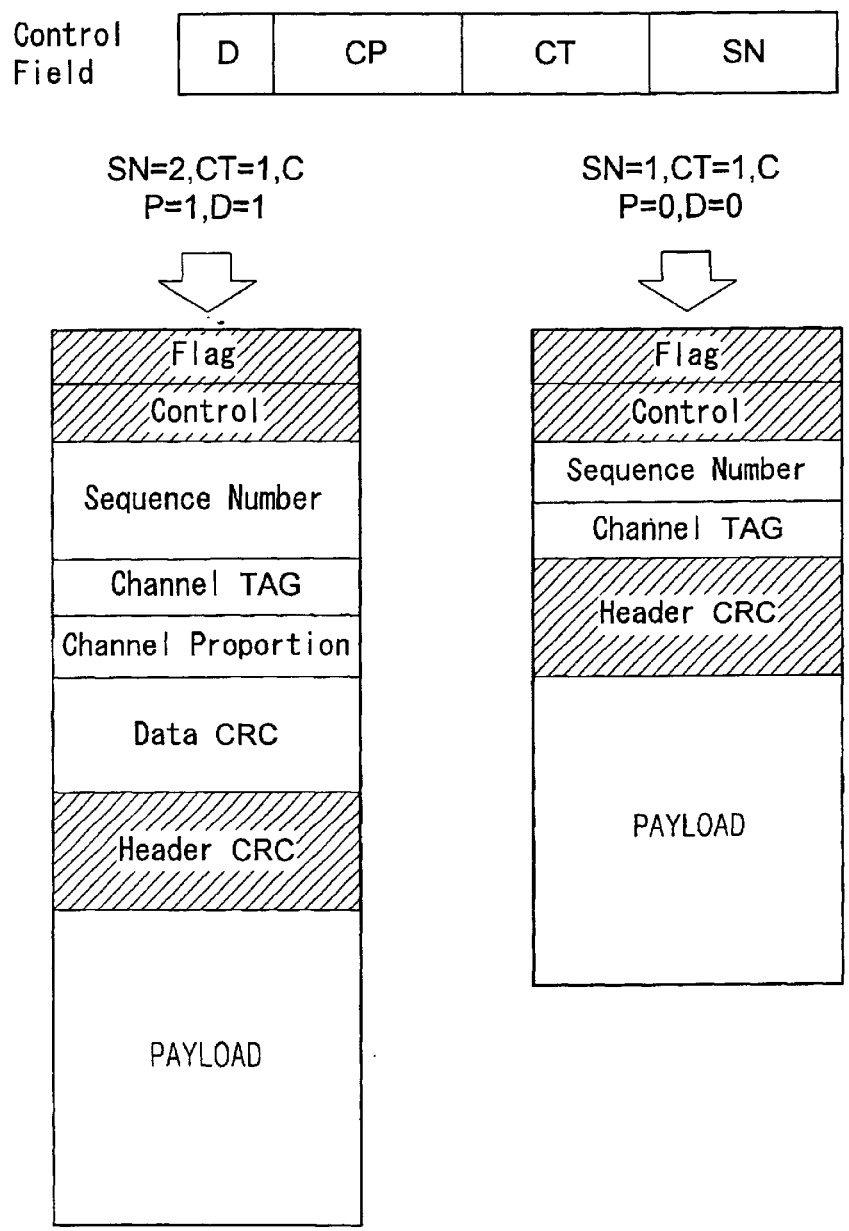
FIG. 7 shows the procedure of header configuration modification according to the H.226.
Figure 8A:
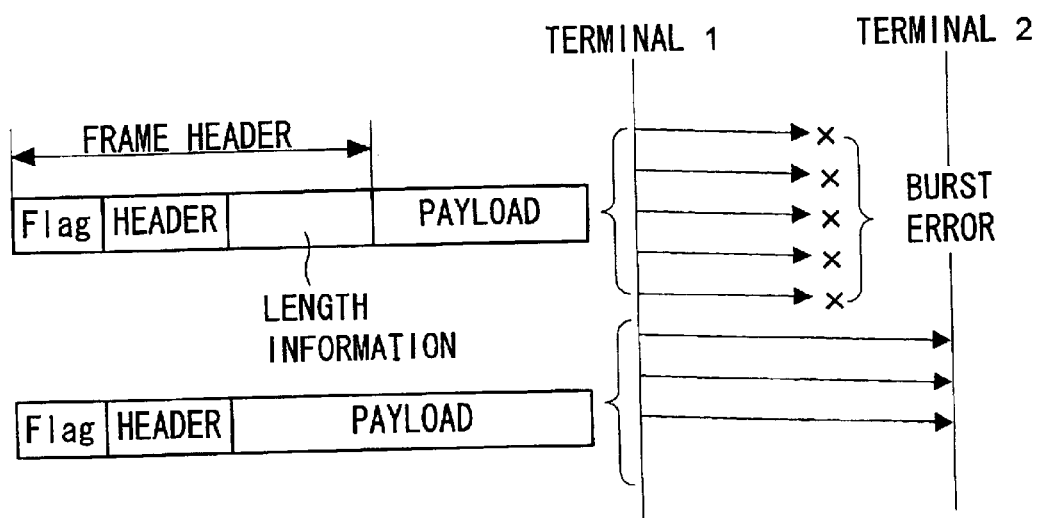
FIGS. 8A and 8B show the problem of the procedure of header configuration modification according to the H.226.]
Figure 8B:
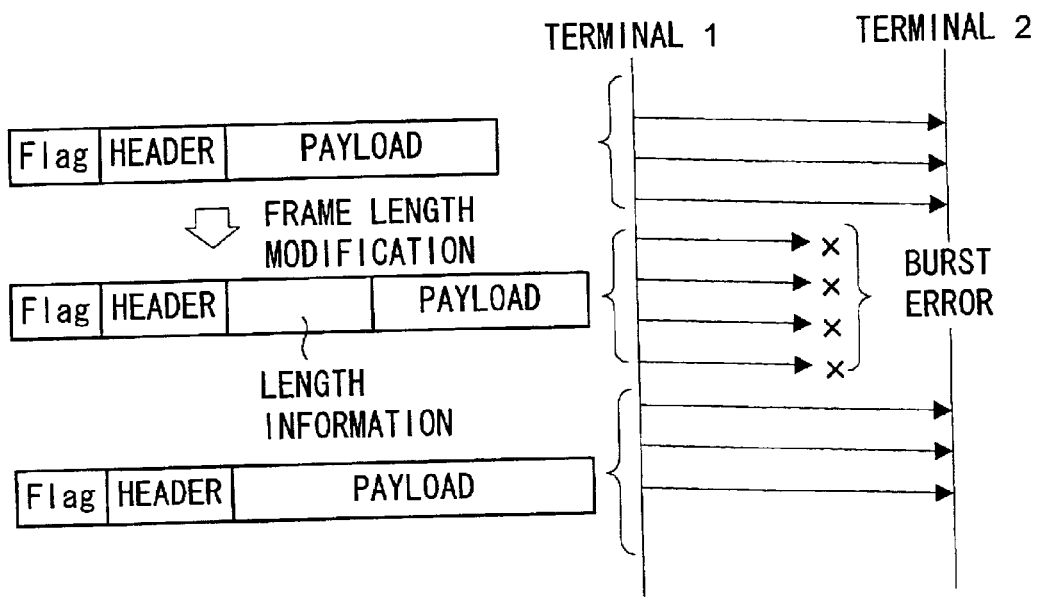

The operation of the unit 112 is explained with reference to a flowchart in FIG. 4.

First, at the beginning of communications, the frame segmentation unit 112 receives received bit stream from the receiver unit 111 (S100), and tries to establish a frame synchronization of configuration 1 based on the information in the frame header (S110). When the synchronization is established, the unit 112 enters via step 120 into the waiting state for frames with configuration 1 (state 1).

When the frame segmentation unit 112 in the state 1 receives the received frame from the receiver unit 111 (S130), the unit 112 first reads the control field 22 in the frame header 20, and makes a judgment of the received frame (S140).

When the control fields 22 of the received frames are "1111", the frame segmentation unit 112 makes a judgment that the received frames are of configuration 1. Based on the judgment, the unit 112 segments the frames into headers and payloads (S150). After the operation of the frame segmentation, the unit 112 returns into the state 1 and waits for frames with configuration 1.

When fixed length frames are used, after the frame synchronization is established, the frame length information in the frame header of configuration 1 is no longer necessary. Therefore, at an arbitrarily time after the synchronization, the receipt control unit 132 of the terminal 1 transmits a modification request command which requests a modification of the configuration 1 to the configuration 2, and starts a timer which measures a subsequent time period after the transmission of the command.

And the unit 132 notifies the frame segmentation unit 112 of transmission of the request command for header configuration modification to configuration 2. This command have a frame length information deletion request and a synchronization frame length information.

Until the terminal 2 receives the commands from the terminal 1, the terminal 2 transmits frames with configuration 1.

The frames input to the unit 112 at the terminal 1 immediately after transmitting command are frames with configuration 1 which the terminal 2 transmitted to the terminal 1 before receiving the commands from the terminal 1. Namely, the frames with configuration 1 generated by the frame generation unit 122 of the terminal 2 before the terminal 2 receives the command from the terminal 1 are input to the unit 112.

In the terminal 2, the commands from the terminal 1 is input via the receiver unit 111, the unit 112 and the demultiplexer 113 to the transmission control unit 131. The unit 131 of the terminal 2 analyzes the commands. When the commands are request commands for header configuration modification, the unit 131 orders the frame generation unit 122 to modify the header configuration. In other words, a notification is made that modification of the frame configuration be made from the configuration 1 to the configuration 2.

When the commands are frame length information deletion request, the unit 131 compares the frame length transmitted by the terminal 2 with the synchronization frame length information of the terminal 1 in the commands. When they are the same length, the unit 131 accepts the request.

By receiving the notification from the transmission control unit 131, the frame generation unit 122 promptly carries out changing frame configuration (from the configuration 1 to the configuration 2). Then the unit 122 starts generating frames with configuration 2, and outputs the frames to the transmitter unit 121. When the unit 121 receives the frames with configuration 2 from the unit 122, the unit 121 transmits them to the terminal 1 through the communications channel (t2 in FIG. 2).

At this time, the terminal 1 continues to receive frames with configuration 1 and waits for frames with configuration 2 (STATE 1 in FIG. 2). Therefore, the terminal 1 is able to receive these frames with configuration 2. The operation of the frame segmentation unit 112 which receives the frames with configuration 2 is explained with reference to FIG. 4.

When the segmentation unit 112 receives frame from the receiver unit 111, the unit 112 reads control field 22 in frame header. Then the unit 112 makes a judgment about the frame configuration (S140).

When the control field 22 of the received frame are "0111", the frame segmentation unit 112 makes a judgment that the received frame is of configuration 2 which does not have frame length information. Whether or not to accept a frame with configuration 2 depends on whether or not the receiver unit 132 has received command transmission notification (S160).

When the notification has been received, based on the frame information of the configuration 2, the unit 112 segments the frames into headers and payloads (S180), and enters into a waiting state for frames with configuration 2 (state 2). Then, when the segmentation operation is ended, the frame segmentation unit 112 notifies the receipt control unit 132 that the modification to configuration 2 is ended.

When the notification from the receipt control unit 132 has not been received, the frame segmentation unit 112 makes a judgment that some kind of errors are happening (S170), carries out an error handling, and continues to be in the waiting state for frames with configuration 1 (state 1).

When the receipt control unit 132 receives the notification from the frame segmentation unit 112 and confirms the modification of the received frame configuration from the configuration 1 to the configuration 2, the unit 132 ends the timer. When the value of the timer exceeds a prescribed threshold and still the unit 132 has not received completion notification (this situation being time out), the unit 132 retransmits the modification request command to the terminal 2.

When the frame segmentation unit 112 under the state 2 receives frames with configuration 2, based on the frame information of the configuration 2, the unit 112 segments the received frames into headers and payloads and returns into the state 2 (S200, S210 S220). On the other hand, when the unit 112 receives frames with configuration 1, based on the frame information of the configuration 1, the unit 112 segments the received frames into headers and payloads and enters into the waiting state for frames with configuration 1 (the state 1) (S200, S210, S230). Here, the modification from the configuration 2 to the configuration 1 means adding frame length information, and any header configuration modification procedure by modification request command is not required. Because after the modification, it is possible to carry out frame synchronization by using the frame length information. And it is also easy to reestablish the frame synchronization at the receiving side under a presence of transmission error.

And when there is a desire to modify length of a fixed length frames at the terminal 2 side, by using frames with configuration 1, that is by notifying the terminal 1 of new frame length by using frames with frame length information after frame length modification, it becomes possible to quickly achieve a communications with new frame length.

After switching to the new frame length, when there is again a desire to modify the header configuration, the above-mentioned procedure can be used.

VARIATIONS OR MODIFICATIONS

In the preferred embodiment, the request command for the header configuration modification is multiplexed with the user data and transmitted by in-band signaling. But the command can be transmitted and received through an out-band control channel. In the above explanation, the channel quality for the control command is not mentioned, but a quality guaranteed channel can be used for realizing reliable control.

And, only the frame length information field modification is explained. But it does not mean to limit the invention only for the frame length field modification. For example, the present invention can apply to a modification of a Data CRC field.

Also, in order to explain the frame length field modification, a fixed length frame is used as a premise and the explanation is made on the assumption that frame length is same before and after the header configuration modification. But this does not mean to limit the invention. It is possible to adopt a variable length frame which has the different frame length before and after the header configuration modification. However, if a variable length frame is used, deleting a frame length information is not desirable.

What is claimed is:

1. A frame transmission apparatus comprising:
   a frame transmitting means for transmitting frames and a request for frame configuration modification to an apparatus of a communication partner; and,
   a frame receiving means for receiving frames from the apparatus of the communication partner, the frame receiving means, when the request for frame configuration modification is transmitted to the apparatus of the communication partner, receiving frames whose configuration has not been modified, while waiting for frame whose configuration has been modified,
   wherein in a case that the frame configuration modification is a modification for adding a header field, the modification is carried out without waiting for a request for frame configuration modification, and frames whose configuration has been modified are transmitted.

2. A method for modifying a frame configuration, comprising the steps of:
   receiving by a receiver frames of data in synchronization sent from a sender, the frames having a frame configuration;
   requesting the sender by the receiver to modify the frame configuration for adding a header of the data being received by the receiver; and
   upon a reception of a frame having a frame configuration which is modified as requested by the receiver, automatically reconfiguring the receiver according the modified frame configuration so as to receive frames of the modified frame configuration in synchronization.

3. A method according to claim 2, wherein the modification to the frame configuration comprises an omission of frame length information from a header included in the frames.

4. A method according to claim 3, further comprising automatically restoring the reconfigured receiver upon a reception of a frame in which the omitted information is restored in the header unilaterally by the sender.

5. A method according to claim 2, wherein the modification to the frame configuration comprises a modification to a data CRC field in a header included in the frames.

6. A method according to claim 2, further comprising repeating the request for modification to the frame configuration if a frame having the modified frame configuration is not received within a period of time.

7. A method according to claim 2, further comprising performing an error handling at the receiver if the receiver receives a frame having a frame configuration with an unintended modification made thereon.

8. A frame transmission apparatus, comprising:
   a receiver unit that receives frames of data from a sender, the frames having a frame configuration;
   a frame segmentation unit that establishes, according to the frame configuration; frame synchronization on the frames being received; and
   a receipt control unit that monitors the frame segmentation unit and, a period of time after the frame segmentation unit establishes the frame synchronization, sends the sender a request to modify the frame configuration of the frames being received by the receiver unit, wherein
   upon a reception, by the receiver unit, of a frame having a frame configuration which is modified as requested by the receipt control unit, the frame segmentation unit is automatically reconfigured, according the modified frame configuration, so as to receive frames of the modified frame configuration in synchronization.

9. An apparatus according to claim 8, wherein the modification to the frame configuration comprises an omission of frame length information from a header included in the frames.

10. An apparatus according to claim 9, wherein the reconfigured frame segmentation unit automatically restored upon a reception of a frame in which the omitted information is restored in the header unilaterally by the sender.

11. An apparatus according to claim 8, wherein the modification to the frame configuration comprises a modification to a data CRC field in a header included in the frames.

12. An apparatus according to claim 8, wherein the receipt control unit repeats sending the request to the sender if a frame having the modified frame configuration is not received within a period of time.

13. An apparatus according to claim 8, wherein the frame segmentation unit performs an error handling when it receives a frame having a frame configuration with an unintended modification made thereon.

* * * * *